(12) United States Patent
Unrein

(10) Patent No.: US 6,490,157 B2
(45) Date of Patent: *Dec. 3, 2002

(54) METHOD AND APPARATUS FOR PROVIDING MANAGED MODULAR SUB-ENVIRONMENTS IN A PERSONAL COMPUTER

(75) Inventor: Edgar J. Unrein, Steilacoom, WA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/388,848

(22) Filed: Sep. 1, 1999

(65) Prior Publication Data

US 2002/0001175 A1 Jan. 3, 2002

(51) Int. Cl.$^7$ .................................................. G05F 1/20
(52) U.S. Cl. ...................... 361/687; 361/679; 312/223.2
(58) Field of Search ........................ 361/679, 683–688, 361/691–697; 174/35 R, 17 VA, 35 TS; 367/753, 799, 816, 818, 391, 395; 439/61, 74, 928; 312/223.2

(56) References Cited

U.S. PATENT DOCUMENTS

| 5,227,957 A | * | 7/1993 | Deters .......................... 361/395 |
| 5,576,931 A | * | 11/1996 | Crane, Jr. et al. ............ 361/687 |
| 5,822,184 A | * | 10/1998 | Rabinovitz ................... 361/685 |
| 5,991,163 A | * | 11/1999 | Marconi et al. ............. 361/788 |
| 6,018,125 A | * | 1/2000 | Collins et al. ............. 174/35 R |

* cited by examiner

*Primary Examiner*—Darren Schuberg
*Assistant Examiner*—Yean H. Chang
(74) *Attorney, Agent, or Firm*—Blakely, Sokoloff, Taylor & Zafman LLP

(57) ABSTRACT

A managed modular sub-environment for a computer system. In one embodiment, a plurality of modular managed sub-environments are included within an outer enclosure of a computer system. In one embodiment, the modular managed sub-environments have a managed thermal environment and a managed electromagnetic interference (EMI) environment. The computer system components enclosed within each sub-environment are less likely to be affected by the EMI or thermal energy from another neighboring sub-environment. Each of the plurality of modular managed sub-environments are coupled to a computer system backplane including a common bus, which distributes communications and power among the plurality of modular managed sub-environments.

19 Claims, 12 Drawing Sheets

METHOD AND APPARATUS FOR PROVIDING MANAGED MODULAR SUB-ENVIRONMENTS IN A PERSONAL COMPUTER

BACKGROUND OF THE INVENTION

1. Field of the Invention

The present invention relates to computer systems generally and, more specifically, the present invention relates to the environment inside a computer system enclosure.

2. Background Information

When the personal computer (PC) architecture was originally designed in the early 1980s, the internal electronic components used operated at substantially slower clock speeds and consumed substantially less power. Since then, the electronic components have continuously become more advanced resulting in tremendously smaller, faster and more powerful computer systems. Thus, the electronic components used in present day PCs consume much more power and operate at much greater clock speeds. Correspondingly, present day electronic components generate much more heat and emit much more electromagnetic interference (EMI) than their earlier counterparts.

Notwithstanding the technology leaps made in the electronic components of PCs, the design of the architecture established in the early 1980s has changed very little, if at all. That is, the PC box used to enclose advanced present day electronic components is basically of the same design as the PC box originally designed in the early 1980s. When the PC engineers originally designed the PC box, they did not need to consider the power and thermal requirements of present day electronic components. In addition, the PC engineers also did not need to consider the consequences of the EMI emitted by present day high frequency electronic components.

With PC technology constantly advancing, the environment inside the PC box is continuously becoming much more hostile for electronic components due to the increasing amounts of EMI and temperature. Consequences of the hostile environment inside the PC box include decreased reliability, increased costs and limits on clock speeds and power consumption.

SUMMARY OF THE INVENTION

A managed sub-environment for a computer system is disclosed. In one embodiment, the managed sub-environment includes an electromagnetic interference (EMI) and thermal enclosure. An enclosure connector is disposed on the enclosure and is adapted to be engaged with a backplane connector of a computer system backplane. A computer system device is enclosed by the enclosure and is coupled to the enclosure connector such that the computer system device is adapted to be coupled to the computer system backplane. The enclosure is to isolate an EMI environment of the computer system device from EMI outside the enclosure. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A managed modular sub-environment for a computer system is disclosed. The subject of the present invention will be described with reference to numerous details set forth below. The accompanying drawings will illustrate the invention. The following description and drawings are illustrative of the invention and are not to be construed as limiting the invention. Numerous specific details are described to provide a thorough understanding of the present invention. In certain instances, however, well-known or conventional details are not described in order not to obscure the present invention.

One embodiment of the present invention is directed to a plurality of managed sub-environments inside a computer system enclosure. In particular, in one embodiment, both the thermal and EMI environments are managed within the sub-environment enclosure such that there is increased thermal and EMI protection for the computer system component(s) that are inside the sub-environment enclosure. Correspondingly, there is increased protection for other computer system components that are outside the sub-environment enclosure from the computer system component(s) that are inside the sub-environment enclosure. The resulting computer system in accordance with the teachings of the present invention therefore has increased reliability due in part to the higher thermal and EMI capacity. Moreover, the present invention allows for advances in electronics technology to continue. In particular, the increased thermal requirements, as well as the increased EMI requirements of advancing technologies can be better accommodated by a computer system having managed sub-environments in accordance with the teachings of the present invention.

In another aspect of the present invention, the plurality of managed sub-environment enclosures of the present invention are organized into modules that may be swapped into and out of a computer system backplane. In one embodiment, the backplane includes a common bus for communications and power distribution between the plurality of managed sub-environment enclosure modules. As a result, modules can be removed and replaced with other modules in the event one of the managed sub-environment enclosure modules fails or if a user wishes to upgrade his or her computer system.

In one embodiment, flash memory including the specific basic input/output system (BIOS) and/or driver routines for the computer system component(s) contained within each respective managed sub-environment enclosure module is included with each module. Since the BIOS/drivers are included with each managed sub-environment enclosure module, the modules are more easily replaced and upgraded in comparison with present day computer system upgrades in which users must sometimes separately install driver software.

Figure 1A:
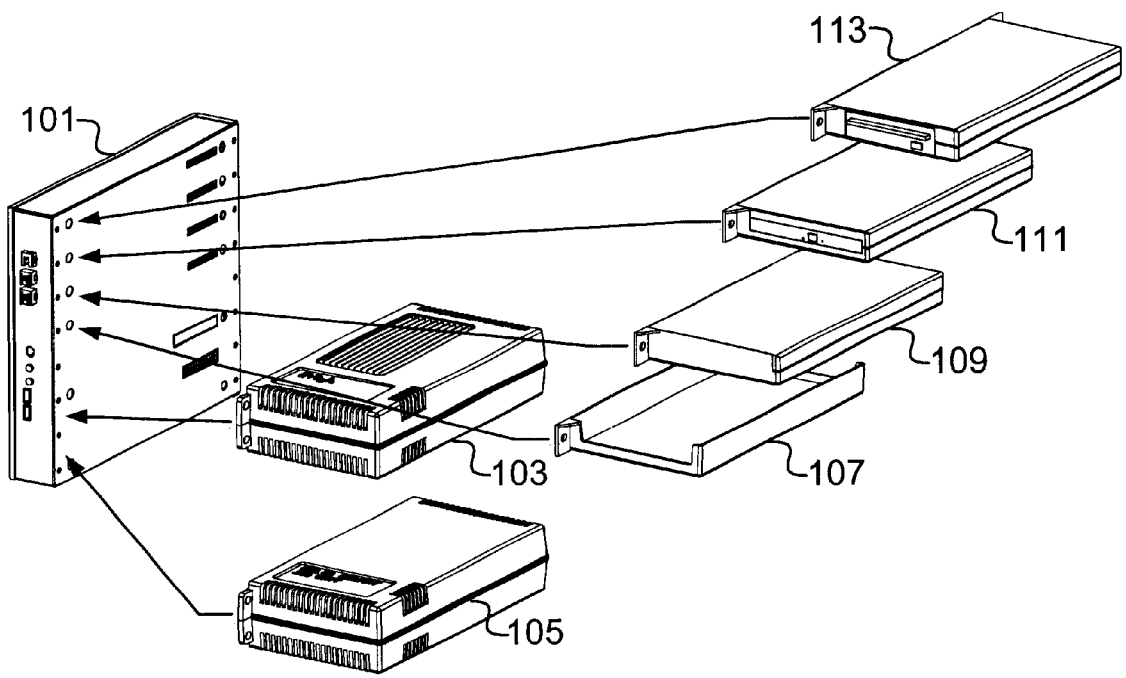
FIG. 1A is an exploded diagram illustrating one embodiment of a plurality of sub-environments coupled to a backplane in accordance with the teachings of the present invention.

FIG. 1A is an illustration showing one embodiment of a plurality of modular managed sub-environments for a computer system in accordance with the teachings of the present invention. In the example illustrated, the computer system includes a computer system backplane 101 adapted to receive a plurality of modules. For example, in one embodiment module 103 includes a central processing unit (CPU) and associated support circuitry, module 105 includes a power supply, module 107 includes a modular tray, module 109 includes a hard disk drive, module 111 includes a compact disc-read-only memory (CD-ROM) or digital versatile disk (DVD) drive and module 113 includes a floppy disk drive.

In one embodiment, modules 107, 109, 111 and 113 contain optional computer system components for the computer system. The combination of example optional computer system components above is provided for explanation purposes only. Other combinations of modular computer system components may be utilized in accordance with the teachings of the present invention. Examples of other types of modular optional computer system components of the present invention include, but are not limited to input/output modules, interface modules, modems, graphics modules, audio modules, video modules, storage device modules, etc.

In one embodiment, each of the modules are swappable and may be replaced or upgraded by a user. Each of the modules may be plugged into computer system backplane 101. As will be discussed, one embodiment of computer system backplane 101 includes a common bus used to provide and distribute communications and power among each of the installed modules.

In one embodiment, at least one, some or all of the modules provide a managed sub-environment for the computer system components enclosed therein. For instance, in one embodiment, module 103 includes an enclosure that separates the environment inside the enclosure from the environment outside the enclosure. Thus, the EMI produced by the computer system component (e.g. CPU) contained within the enclosure of module 103 is inhibited from being emitted out of the enclosure. Conversely, the EMI outside the enclosure of module 103 is inhibited from being emitted into the enclosure. Another feature of the enclosure of module 103 is that the thermal energy or heat produced by the computer system component (e.g. CPU) is controlled and/or inhibited from being emitted freely out of the enclosure. Conversely, the thermal energy or heat outside the enclosure of module 103 is inhibited from being emitted into the enclosure.

By managing or controlling the sub-environments within each enclosure of the modules of the present invention, the increasing amounts of thermal energy and/or EMI being produced by continuously advancing computer system chips is better controlled. As a result, computer system reliability is increased in one embodiment since there is a decreased possibility of a computer system component from being adversely affected by the thermal energy or EMI produced by another computer system component.

Figure 1B:
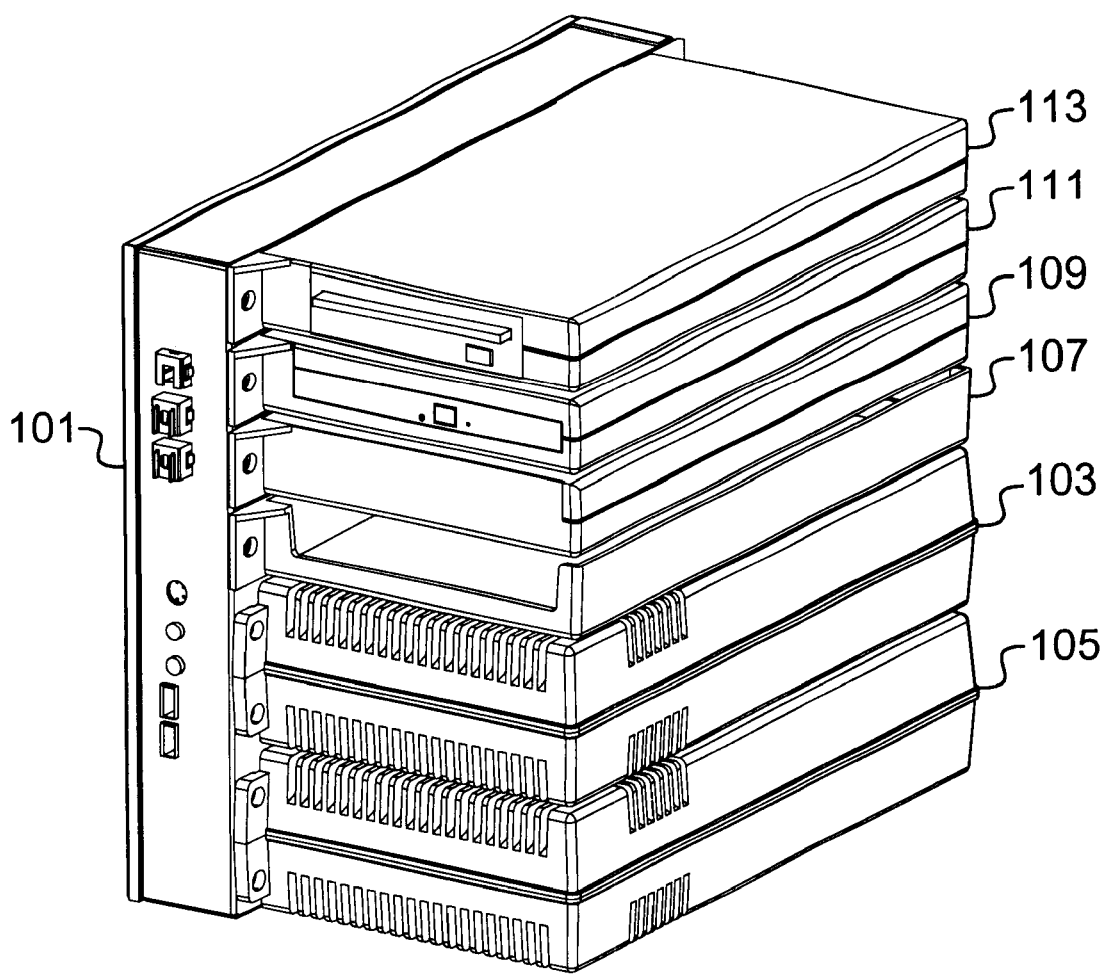
FIG. 1B is a diagram illustrating the plurality of sub-environments assembled with the backplane in accordance with the teachings of the present invention.

FIG. 1B is an illustration of one embodiment of modules 103, 105, 107, 109, 111 and 113 assembled into computer system backplane 101. As illustrated in the embodiment shown in FIGS. 1A and 1B, some of the modules 103, 105, 107, 109, 111 and 113 are half height modules, and some of the other modules are full height modules. In the example illustrated, modules 103 and 105 are full height modules and modules 107, 109, 111 and 113 are half height modules. In one embodiment, half height modules occupy approximately one half of the volume as their full height counterpart modules. It is appreciated that these examples are given merely for illustrative purposes and that other form factors may be utilized in accordance with the teachings of the present invention.

Figure 1C:
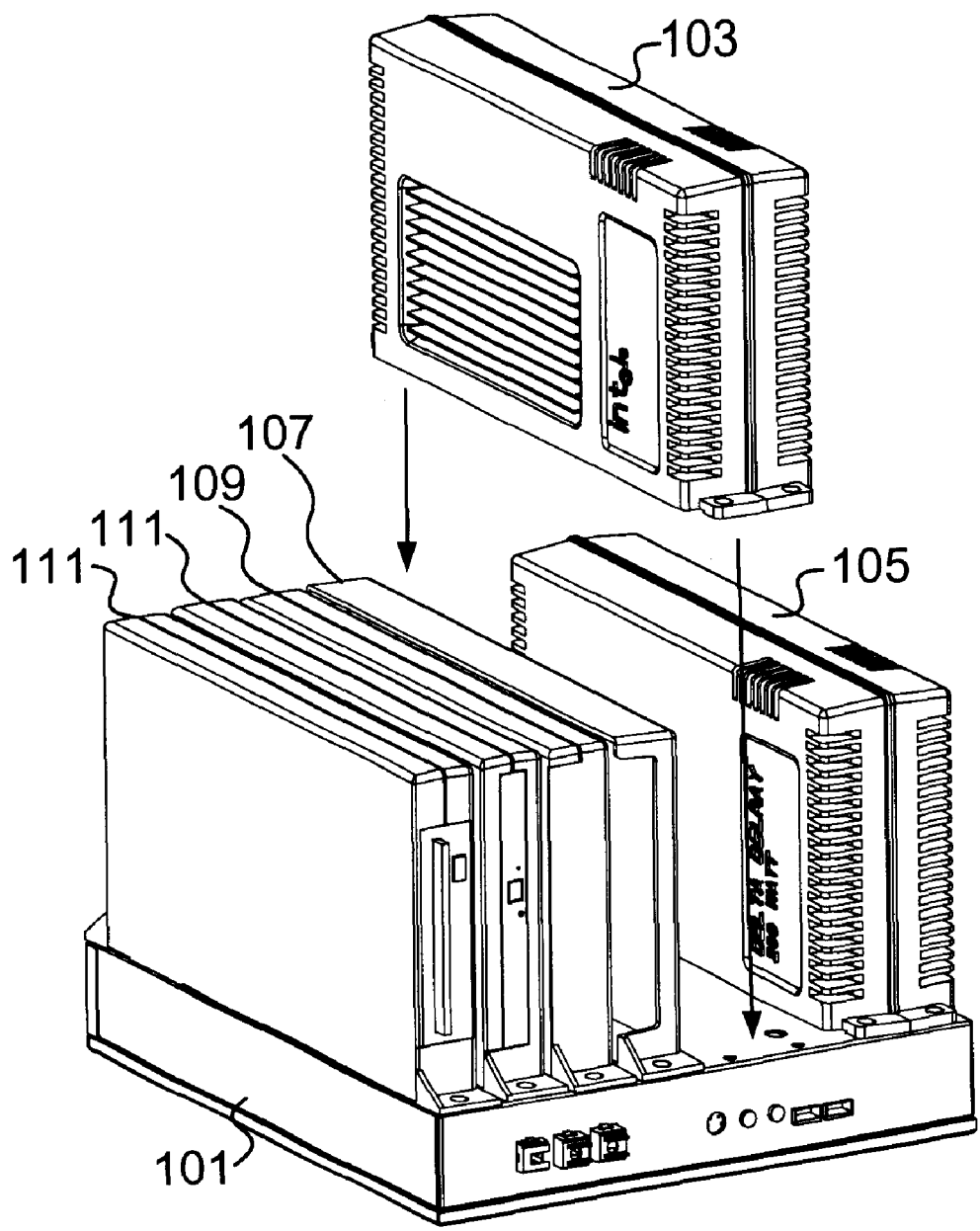
FIG. 1C is a diagram illustrating one embodiment of one of a plurality of modular sub-environments being swapped into a backplane in accordance with the teachings of the present invention.

FIG. 1C is an illustration showing the aspect of the present invention in which at least one, some or all of the modules are swappable and may be replaced or upgraded. In particular, the example shown in FIG. 1C illustrates how module 103 may be installed into place into computer backplane 101 in between modules 105 and 107. In one embodiment, other modules 105,107, 109, 111 and/or 113 may also be removed from computer system backplane 101 and replaced or upgraded in accordance with the teachings of the present invention. It is appreciated that this aspect of the present invention in which modules may be swapped, replaced or upgraded simplifies or lowers the skill required in replacing parts in comparison with present day systems. As will be discussed, the simplification provided by the present invention applies to both hardware and software reconfigurations.

Figure 2A:
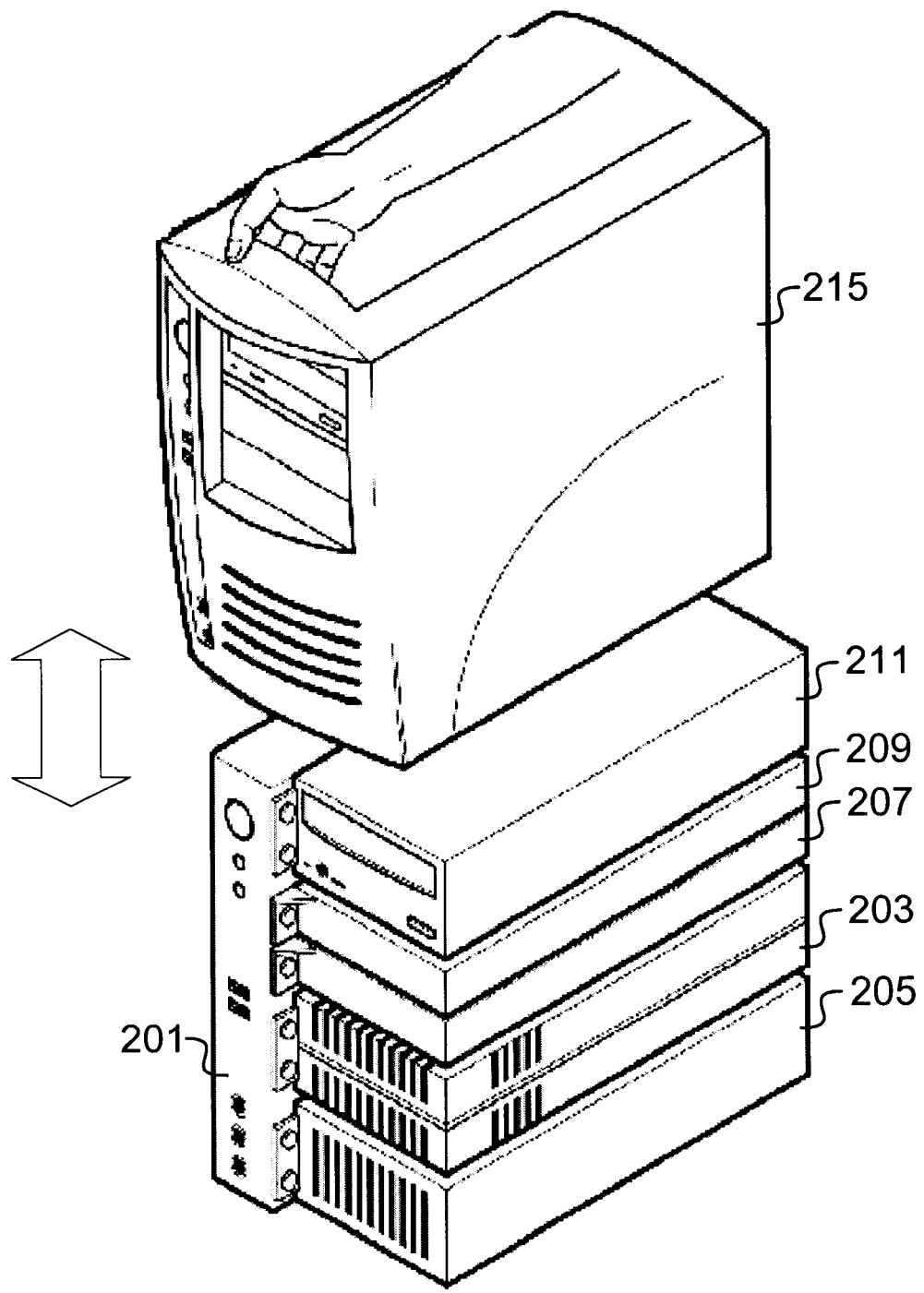
FIG. 2A is a diagram illustrating one embodiment of an outer PC box or enclosure being placed over or removed from the assembled plurality of sub-environments and backplane in accordance with the teachings of the present invention.
Figure 2B:
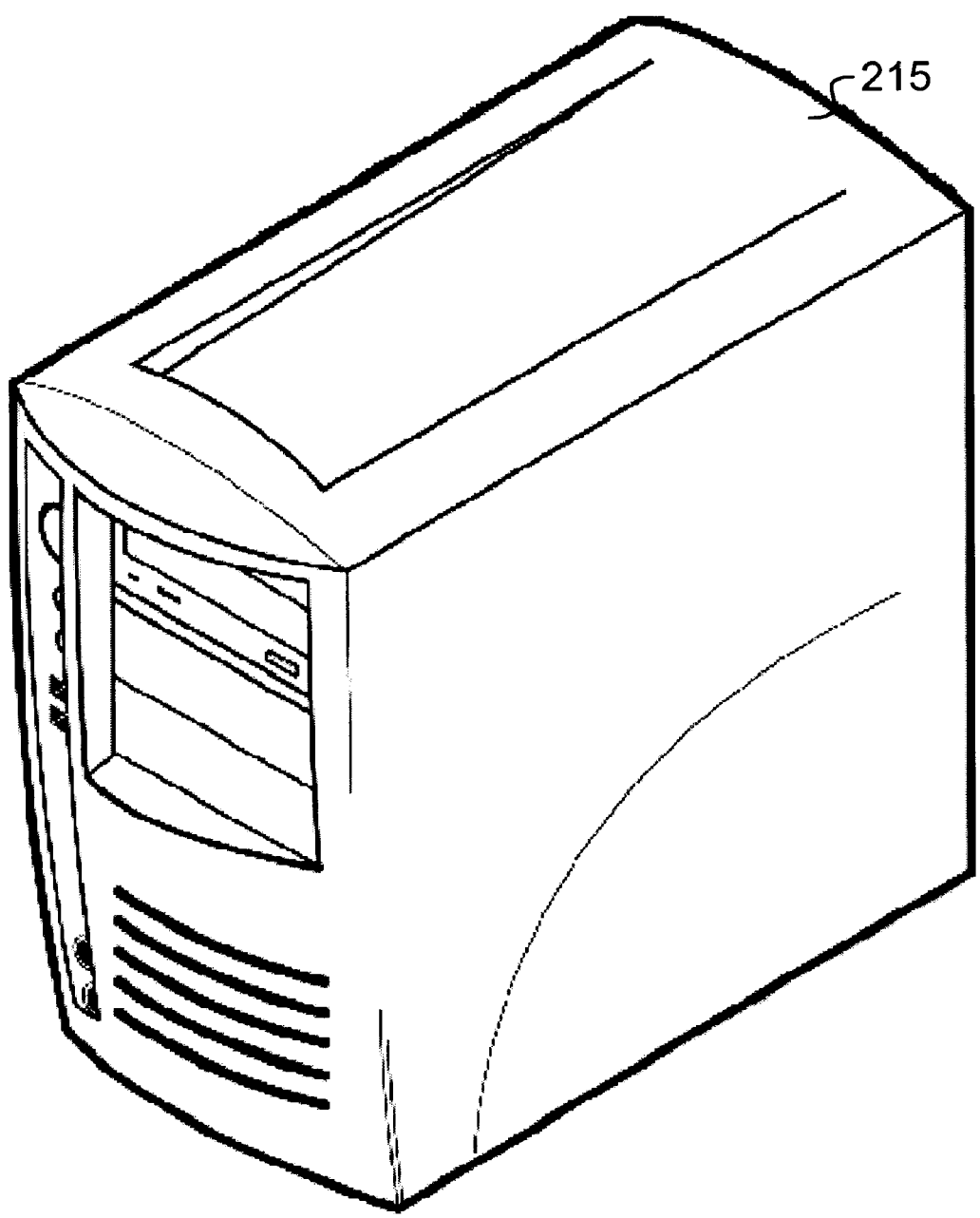
FIG. 2B is a diagram illustrating an assembled outer PC box or enclosure over the assembled plurality of sub-environments and backplane illustrated in FIG. 2A.

FIG. 2A is an illustration showing one embodiment of an outer enclosure 215 being installed over or removed from a computer system backplane 201 on which modules 203, 205, 207, 209 and 211 are installed. In the embodiment illustrated, module 203 encloses a CPU and associated support circuitry, module 205 encloses a power supply and modules 207, 209 and 211 enclose optional computer system components. For instance, module 211 includes a CD-ROM or DVD drive in the example illustrated. Modules 203, 205 and 211 are full height modules and modules 207 and 209 are half height modules in the embodiment illustrated in FIG. 2A. FIG. 2B is an illustration showing outer enclosure 215 completely installed over the assembled computer backplane and modules. Referring back to FIG. 2A, an environment is provided within outer enclosure 215 when installed over computer system backplane 201 and modules 203, 205, 207, 209 and 211. In one embodiment, at least one, some or all of modules 203, 205, 207, 209 and 211 provide managed sub-environments for computer system components enclosed therein within outer enclosure 215.

Figure 3:
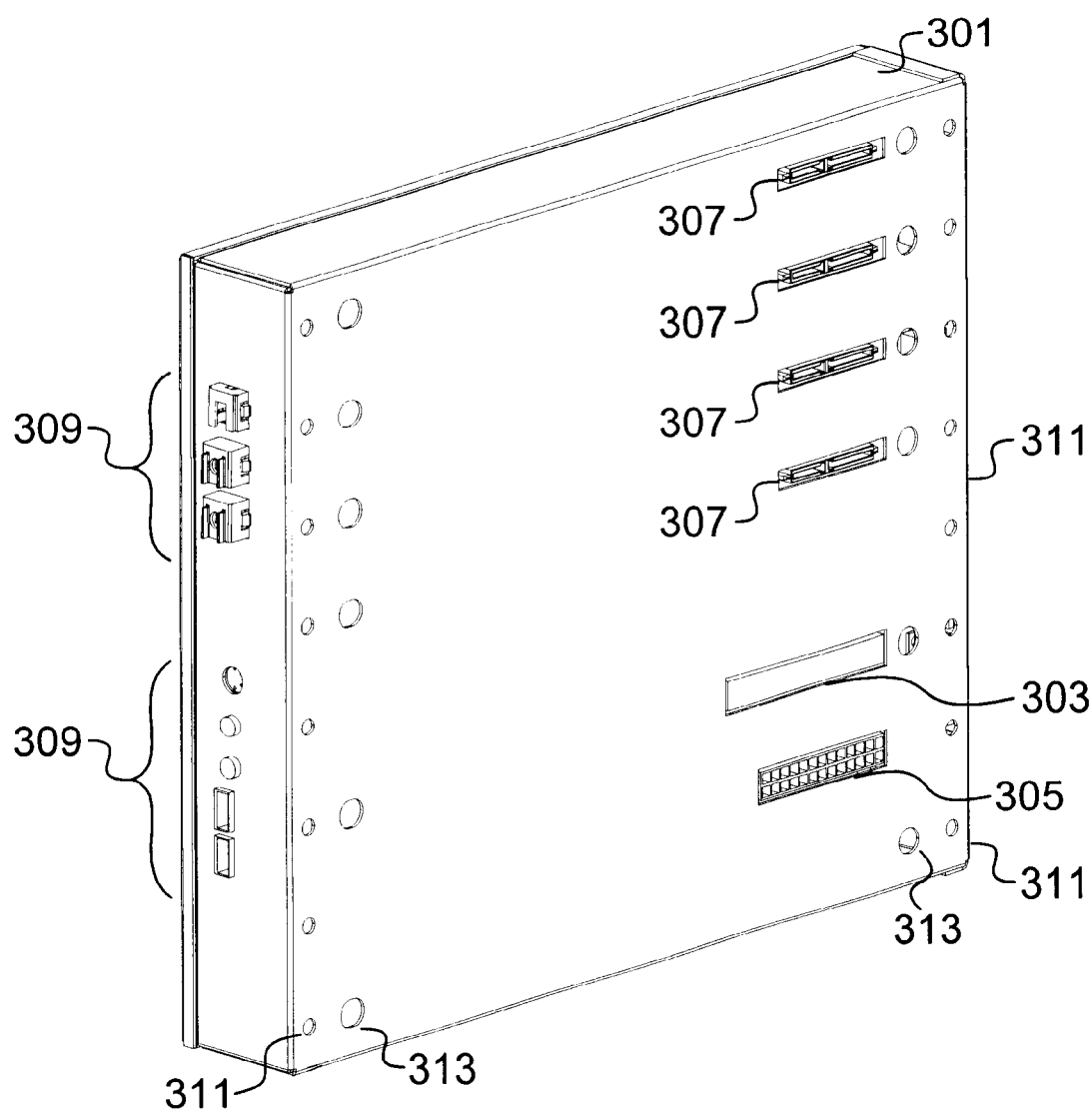
FIG. 3 is a diagram illustrating one embodiment of a backplane in accordance with the teachings of the present invention.

FIG. 3 is an illustration of one embodiment of a computer system backplane 301 in accordance with the teachings of the present invention. In the embodiment illustrated, computer system backplane 301 includes front panel items 309. In one embodiment, front panel items 309 may be accessible to a user even after outer enclosure 215 is installed. In another embodiment, at least one, some or all of the front panel items may be located on a back, top, bottom or side panel of computer system backplane 301. In one embodiment, front panel items may include but are not limited to switches (e.g. a power switch, a reset switch, etc.), light emitting diode (LED) indicators, liquid crystal display (LCD) indicators, communications ports (e.g. parallel, serial, etc.), bus interface ports (e.g. universal serial bus (USB), firewire, etc.), network interface ports, audio in ports, audio out ports, video in ports, video out ports, etc.

In one embodiment, computer system backplane 301 also includes a power supply module connector 305, a CPU module connector 303 and a plurality of optional computer system component module connectors 307. In one embodiment, connector 305 is adapted to be coupled to a corresponding connector on a power supply module, connector 303 is adapted to be coupled to a corresponding connector on a CPU module and each of the connectors 307 are adapted to be coupled to corresponding connectors on optional computer system component modules such as for example but not limited to peripherals. In one embodiment, some of the connectors 307 need not be connected to optional computer system component modules in order for a computer system to function in accordance with the teachings of the present invention.

In one embodiment, more than one of the connectors may be adapted to be coupled to CPU modules. In such an embodiment, the computer system may be dual or multi processor computer system by having more than one CPU module plugged into the connectors of computer system backplane 301. In another embodiment, a dual or multi processor computer system may be provided by including more than one processor within a CPU module. In this embodiment, a CPU module containing more than one processor is coupled to connector 303.

In one embodiment, all of the connectors 303, 305 and 307 are coupled together within computer system backplane with a common bus. In one embodiment, the common bus coupling together connectors 303, 305 and 307 provide and distribute communications and power among the modules coupled to connectors 303, 305 and 307. In one embodiment, power is supplied to the common bus coupling connectors 303, 305 and 307 with the power supply module that is to be coupled to connector 305.

As illustrated in FIG. 3, one embodiment of computer system backplane 301 includes a plurality of mounting holes 311 and a plurality of alignment holes 313. In one embodiment, mounting holes 311 are used when mounting modules to computer system backplane 301. Alignment holes 313 are used to help properly align modules that are to be installed onto computer system backplane 301. In the example illustrated in FIG. 3, mounting holes 311 are separated by 1⅜ inches along the height of computer system backplane 301 and are separated by 12 inches along the length of computer system backplane 301 in one embodiment. These dimensions are given for illustration purposes only and other form factors may be utilized in accordance with the teachings of the present invention.

Figure 4A:
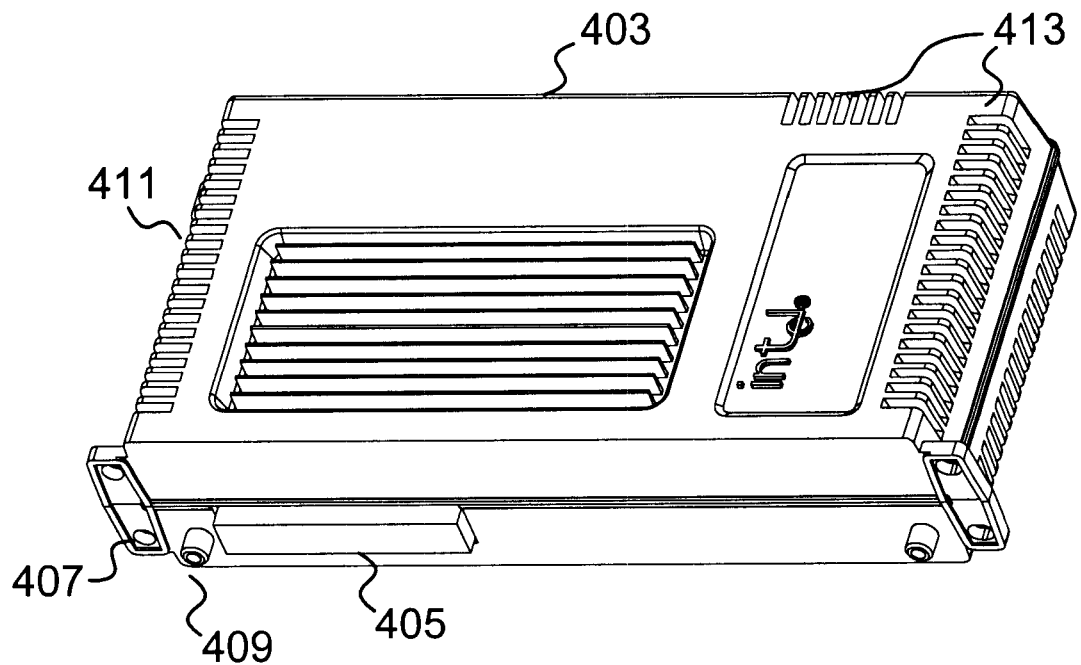
FIG. 4A is a diagram illustrating one embodiment of a modular managed sub-environment enclosure for core integrated circuitry of a computer system in accordance with the teachings of the present invention.

FIG. 4A is an exterior illustration of one embodiment of a CPU module in accordance with the teachings of the present invention. In one embodiment, the CPU module includes an enclosure 403, which encloses a managed sub-environment in accordance with the teachings of the present invention. In one embodiment, enclosure 403 inhibits EMI and/or thermal energy from passing into and out of enclosure 403. In particular, enclosure 403 in one embodiment provides EMI shielding for the CPU and/or other CPU support circuitry enclosed therein.

In addition, enclosure 403 in one embodiment provides thermal insulation for the CPU and/or other CPU support circuitry enclosed therein. Thus, the contents enclosed in the sub-environment within enclosure 403 are provided some thermal protection from thermal energy outside enclosure 403. In one embodiment, a heat exchanger is also included within enclosure 403 to help manage or control the thermal environment within enclosure 403. In one embodiment, the heat exchanger utilizes forced and/or natural convection through enclosure 403. In one embodiment, the shape or cross section of enclosure 403 may also be utilized to provide managed heat sink bypass airflow. In one embodiment, the material selected to be used for enclosure 403 and integrated heat transfer fins (not shown) on enclosure 403 may also be features of a heat exchanger in accordance with the teachings of the present invention.

In the embodiment illustrated in FIG. 4, the heat exchanger includes air inlets 413 and air outlet 411. Air may be vented into the sub-environment within enclosure 403 through air inlets 413 and air outlet 411 in one embodiment to help manage the temperature within the sub-environment within enclosure 403. In one embodiment, air inlets 413 and air outlet 411 include waveguides to inhibit EMI from passing through air inlets 413 and air outlet 411. In one embodiment, the waveguides are constructed using known techniques and allow air to pass while inhibiting EMI from passing.

In one embodiment, the CPU module of FIG. 4A also includes a connector 405, which is adapted to be coupled to connector 303 of computer system backplane 301. In one embodiment, the CPU module also includes mounting holes 407, which are to be mounted to corresponding mounting holes 311 of computer system backplane 301, and alignment knobs 409, which are to be engaged with corresponding alignment holes 313 of computer system backplane 301.

As illustrated in FIG. 4A, one embodiment of enclosure 403 is a full height module and is 2⅝ inches high and 6 1/16 inch wide. The mounting holes 407 are separated by 1⅜ inches along the height and 12 inches along the length. These dimensions are given for illustration purposes only and other form factors may be utilized in accordance with the teachings of the present invention.

Figure 4B:
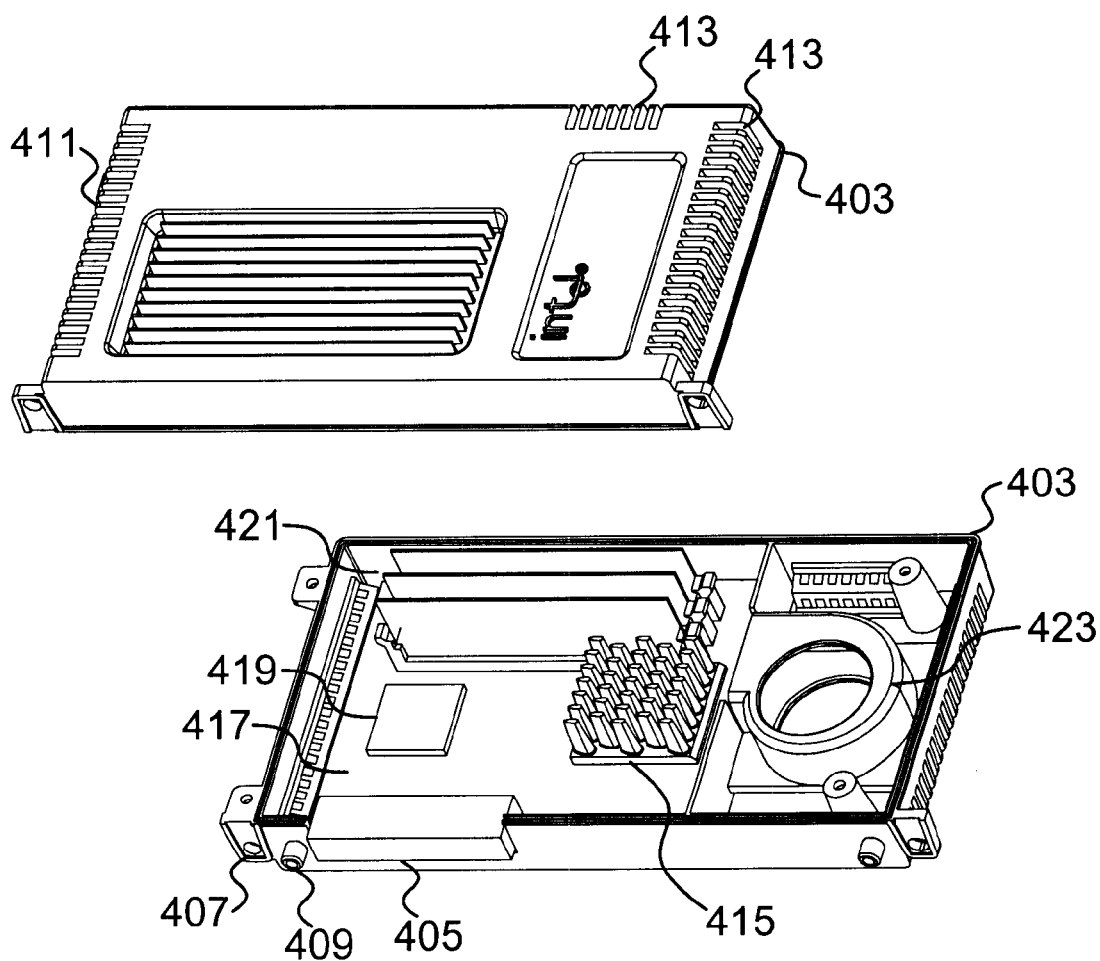
FIG. 4B is a diagram illustrating one embodiment of the contents of a modular managed sub-environment enclosure for core integrated circuitry of a computer system in accordance with the teachings of the present invention.

FIG. 4B is an illustration showing one embodiment of the interior of enclosure 403 of the CPU module. In one embodiment, enclosure 403 includes two pieces having an EMI seal that may be assembled together to enclose the sub-environment within enclosure 403. In one embodiment, enclosure 403 is comprised of aluminum or other equivalent EMI insulating material.

As shown in FIG. 4B, one embodiment of the CPU module includes a circuit board 417 including CPU 415 and CPU support circuitry including integrated circuit chip 419 and memory 421. In one embodiment, the integrated circuitry included in the CPU module includes core circuitry of the computer system. For purposes of this disclosure, core circuitry may be taken to mean the CPU and its associated relatively high speed support circuitry including memory, memory controllers, high speed bus controllers, graphic controllers, etc. In the embodiment illustrated, CPU 415 includes a heat sink to help cool CPU 415 during operation. In one embodiment, integrated circuit chip includes relatively high frequency circuitry such as for example but not limited to graphics circuitry (e.g. advanced graphics port (AGP) circuitry), memory controller circuitry, relatively higher speed bus controller circuitry or the like.

In one embodiment, CPU 415 is an Intel Pentium or Celeron family processor or the like. In another embodiment, CPU 415 may be a processor from a different manufacturer such as for example but not limited to a Motorola PowerPC family processor, an Advanced Micro Devices Kx family processor, etc.

In one embodiment using an Intel Pentium or Celeron family processor, the CPU 415, integrated circuitry 419 and memory 421 include the relatively higher frequency circuitry associated with the well known North Bridge/Cluster. In such an embodiment, another module may include the relatively lower frequency circuitry associated with the well known South Bridge/Cluster. For instance, the relatively lower frequency circuitry associated with the South Bridge/Cluster includes relatively lower speed input/output bus controller circuitry, power management control circuitry, etc.

By separating the higher speed circuitry from the lower speed circuitry, the enclosure 403 can be designed specifically to suit the thermal and EMI requirements of the computer system components enclosed therein. For example, relatively higher speed circuitry generates more EMI and generally consumes more power and generates more thermal energy than relatively lower speed circuitry. Therefore, an enclosure 403 used to enclose relatively higher speed circuitry may be designed with increased EMI and thermal energy management capabilities in comparison with an enclosure 403 used to enclose relatively lower speed circuitry.

As illustrated in FIG. 4B, one embodiment of the CPU module also includes a heat exchanger which in one embodiment includes a blower 423 used to help cool CPU 415 by venting air through air inlets 413 and air outlet 411. In another embodiment, CPU 415 may not generate as much thermal energy such that the heat sink on CPU 415 is adequate to cool CPU 415 and blower 423 is not required. In still another embodiment, it is possible that CPU 415 may generate relatively little thermal energy such that convection alone is sufficient to cool the CPU 415. In this embodiment, blower 423 and/or the heat sink on CPU 415 are not included.

It is appreciated that the CPU module illustrated in FIG. 4B may include varying types of CPU 415, integrated circuitry 419 and amounts of memory 421. Indeed, in one embodiment a user may upgrade the computer system by merely swapping only the CPU module of FIG. 4B from computer system backplane 301 with another CPU module including a CPU 415, integrated circuitry 419 and memory 421 with increased computing power. The remaining modules may remain in computer system backplane 301.

Figure 5:
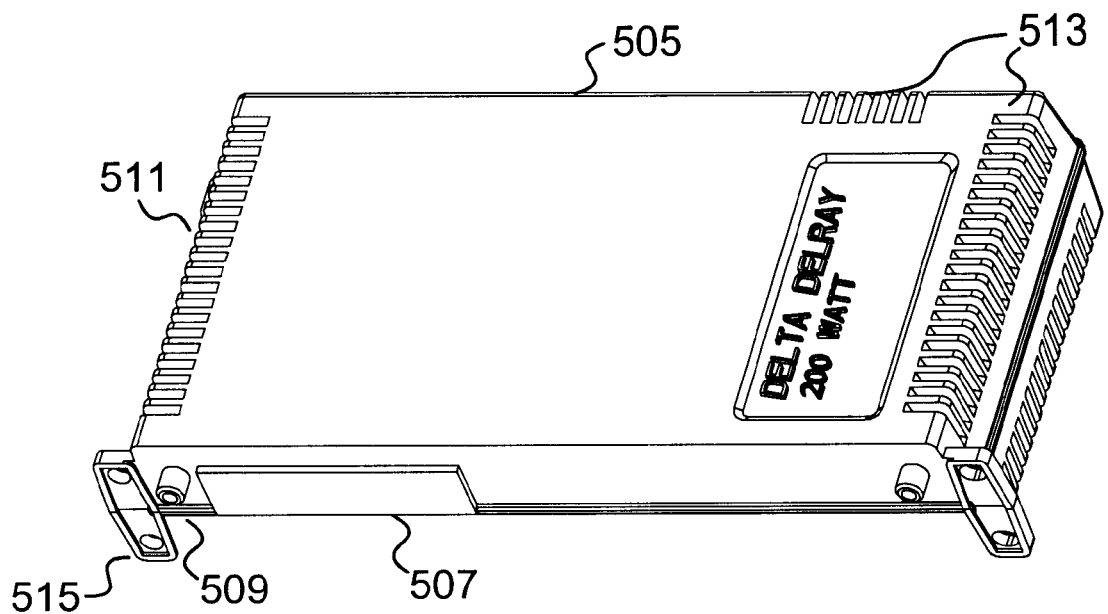
FIG. 5 is a diagram illustrating one embodiment of a modular managed sub-environment enclosure for a power supply in accordance with the teachings of the present invention.

FIG. 5 is an exterior illustration of one embodiment of a power supply module in accordance with the teachings of the present invention. In one embodiment, the power supply module includes an enclosure 505, which encloses the power supply in a managed sub-environment in accordance with the teachings of the present invention. In one embodiment, enclosure 505 inhibits EMI and/or thermal energy from passing into and out of enclosure 505. In one embodiment, a heat exchanger is also included within enclosure 505 to help manage or control the thermal environment within enclosure 505. In one embodiment, the heat exchanger includes air inlets 513 and air outlet 511. Air may be vented into the sub-environment within enclosure 505 through air inlets 513 and air outlet 511 in one embodiment to help manage the temperature within the sub-environment within enclosure 505. In one embodiment, air inlets 513 and air outlet 511 include waveguides that inhibit EMI from passing while allowing air to pass.

In one embodiment, the power supply module of FIG. 5 also includes a connector 507, which is adapted to be coupled to connector 305 of computer system backplane 301. In one embodiment, the power supply module also includes mounting holes 515, which are to be mounted to corresponding mounting holes 311 of computer system backplane 301, and alignment knobs 509, which are to be engaged with corresponding alignment holes 313 of computer system backplane 301.

As illustrated in FIG. 5, one embodiment of enclosure 505 is a full height module and is 2⅝ inches high and 6 1/16 inch wide. The mounting holes 515 are separated by 1⅜ inches along the height and 12 inches along the length. These dimensions are given for illustration purposes only and other form factors may be utilized in accordance with the teachings of the present invention.

Figure 6A:
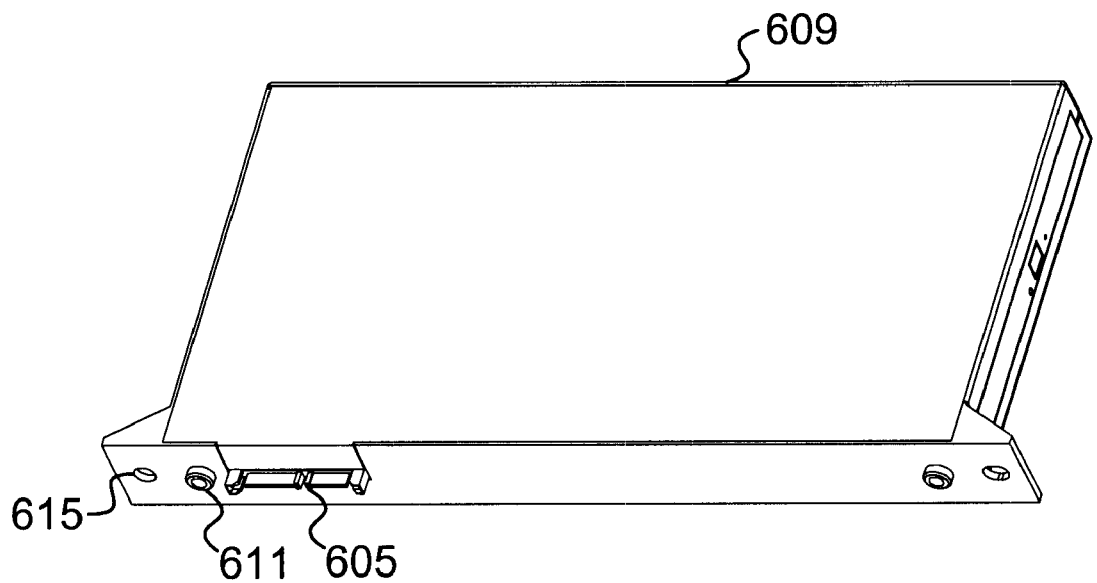
FIG. 6A is a diagram illustrating one embodiment of a modular managed sub-environment enclosure for an optional component of a computer system in accordance with the teachings of the present invention.

FIG. 6A is an exterior illustration of one embodiment of an optional computer system component module in accordance with the teachings of the present invention. In one embodiment, the optional computer system component module includes an enclosure 609, which encloses a managed sub-environment in accordance with the teachings of the present invention. In one embodiment, enclosure 609 inhibits EMI and/or thermal energy from passing into and out of enclosure 609. In particular, enclosure 609 in one embodiment provides EMI shielding for the optional computer system component(s) enclosed therein. In one embodiment, the optional computer system component(s) that may be enclosed within enclosure 509 may include, but are not limited to input/output circuitry (e.g. South Bridge/Cluster circuitry discussed above), interface modules, modems, graphics modules, audio modules, video modules, storage device modules, present day peripheral component interface (PCI) cards, etc.

In one embodiment, the optional computer system component module of FIG. 6A also includes a connector 605, which is adapted to be coupled to one of the connectors 307 of computer system backplane 301. In one embodiment, the optional computer system component module also includes mounting holes 615, which are to be mounted to corresponding mounting holes 311 of computer system backplane 301, and alignment knobs 611, which are to be engaged with corresponding alignment holes 313 of computer system backplane 301. In another embodiment (not shown), a heat exchanger may also included within enclosure 609 to help manage or control the thermal environment within enclosure 609.

As illustrated in FIG. 6A, one embodiment of enclosure 609 is a half height module and is 1¼ inches high and 6 1/16 inch wide. The mounting holes 615 are separated by 12 inches along the length. These dimensions are given for illustration purposes only and other form factors may be utilized in accordance with the teachings of the present invention.

Figure 6B:
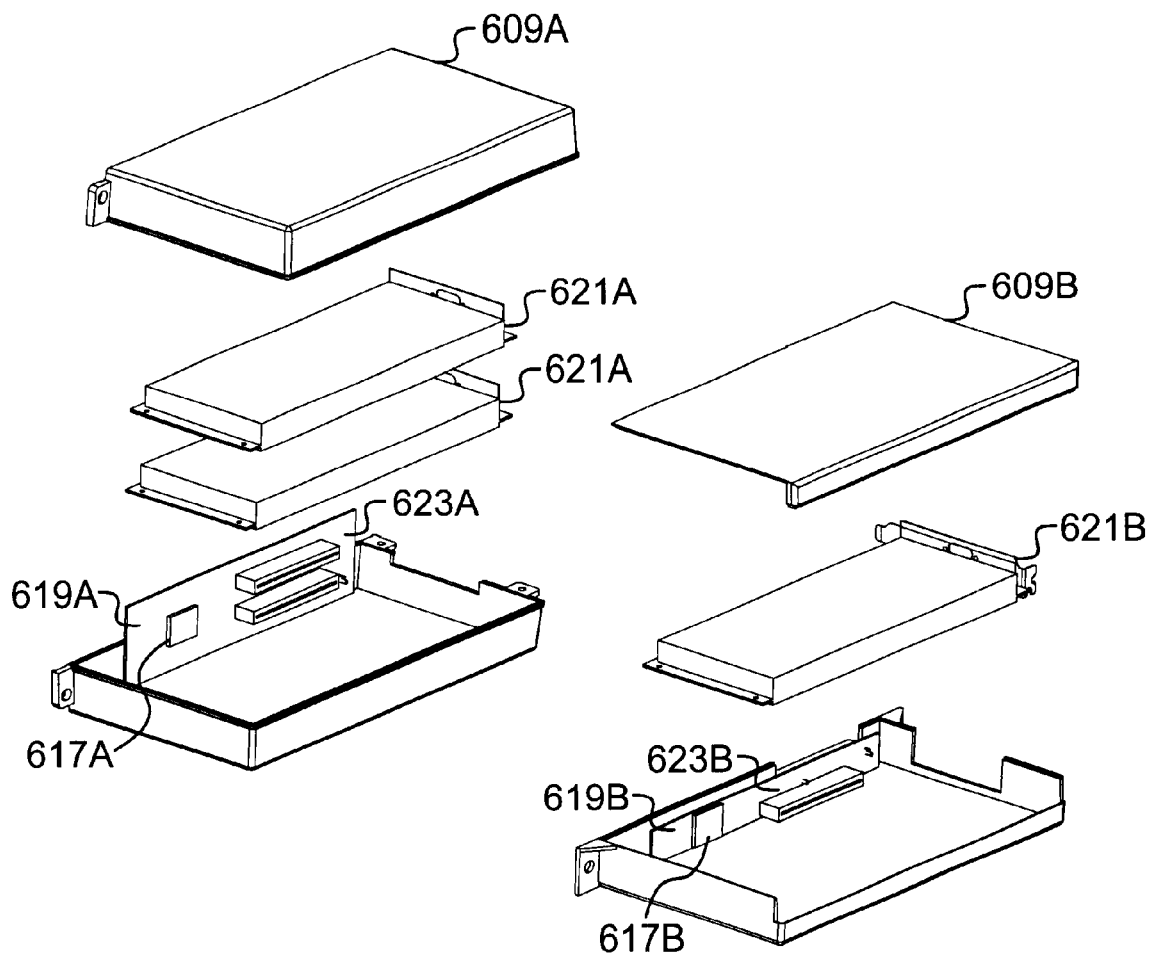
FIG. 6B is a diagram illustrating two embodiments of the contents of modular managed sub-environment enclosures for optional components of a computer system in accordance with the teachings of the present invention.

FIG. 6B is an illustration showing two embodiments of the interior of enclosures 609A and 609B of optional computer system component modules. In the example illustrated, enclosure 609A is a full height module and enclosure 609B is a half height module. In one embodiment, enclosures 609A and 609B each include two pieces having an EMI seal and may be assembled together to enclose the respective sub-environments within enclosures 609A and 609B.

As shown in FIG. 6B, one embodiment of the optional computer system component modules include a circuit board 619A in enclosure 609A and a circuit board 619B in enclosure 609B. As illustrated in the example, circuit board 619A includes a plurality of connectors 623A to which a corresponding plurality of optional computer system component circuit boards 621A may be connected. Circuit board 619B includes a connector 623B to which a corresponding optional computer system component circuit board 621B may be connected. In one embodiment, circuit boards 619A and 619B may be PCI circuit boards of the present day or may be other similar types of circuit boards to provide optional computer system functionality in accordance with the teachings of the present invention.

In one embodiment, circuit board 619A also includes memory 617A and circuit board 619B also includes memory 617B. In one embodiment, memories 617A and 617B are flash memories in which BIOS software and/or driver routines for optional computer system component circuit boards 621A and 621B may be stored. Thus, the specific BIOS and/or driver routines associated with optional computer system component circuit boards 621A and 621B are included within enclosures 609A and 609B, respectively. As a result, one aspect of the present invention is that "plug and play" is provided with modules in accordance with the teachings of the present invention since the BIOS/driver routines do not need to be installed separately in the computer system.

Figure 6C:
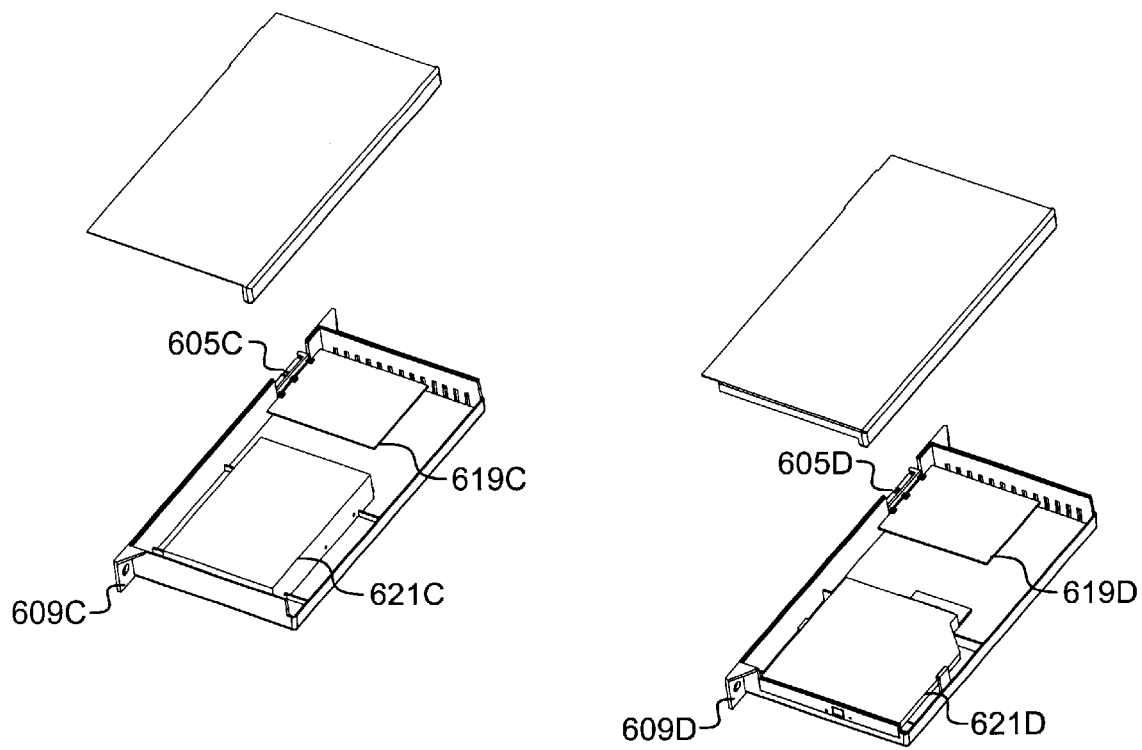
FIG. 6C is a diagram illustrating two embodiments of the contents of modular managed sub-environment enclosures for computer system peripherals such as for example storage devices in accordance with the teachings of the present invention.

FIG. 6C is an illustration showing another two embodiments of the interior of enclosures 609C and 609D of optional computer system modules. In the example illustrated, enclosures 609C and 609D are half height modules. In one embodiment, enclosures 609C and 609D each include two pieces having an EMI seal and may be assembled together to enclose the respective sub-environments within enclosures 609C and 609D.

As shown in FIG. 6C, one embodiment of the optional computer system component modules include a circuit board 619C in enclosure 609C and a circuit board 619D in enclosure 609D. As illustrated in the example, circuit board 619C includes a connector 605C, which may be coupled to a corresponding one of connectors 307 of computer system backplane 301. Circuit board 619D includes a connector 605D, which may be coupled to a corresponding one of connectors 307 of computer system backplane 301.

In the embodiments illustrated in FIG. 6C, circuit board 619C is coupled to and controls a storage device 621C (e.g. hard drive) and circuit 619D is coupled to and controls a CD-ROM or DVD drive 621D. It is appreciated that other types of optional computer system components or peripherals may be coupled to and controlled by circuit boards 619C and 619D in accordance with the teachings of the present invention.

The foregoing description has provided numerous examples of the present invention. It will be appreciated that various modifications and changes may be made thereto without departing from the broader spirit and scope of the invention as set forth in the appended claims.

What is claimed is:

1. A managed sub-environment module for a computer system, comprising:

an electromagnetic interference (EMI) and thermal enclosure comprising first and second half shells, each having a periphery defining a mating surface and including a plurality of air inlet slots and air outlet slots that respectively define an air inlet and air outlet upon assembly of the first half shell to the second half shell, said first and second half shells further having an EMI seal disposed between their respective mating surfaces upon assembly, said EMI and thermal enclosure housing a blower adapted to circulate air from the air inlet to the air outlet, each of said air inlet and air outlet slots disposed toward opposite ends of the enclosure and configured to function as EMI waveguides that substantially inhibit EMI produced from components contained within the enclosure from exiting the enclosure and EMI present in an environment external to the enclosure from entering the enclosure;

an enclosure connector disposed on the enclosure, adapted to be engaged with a backplane connector of a computer system backplane; and a computer system device enclosed by the enclosure and coupled to the enclosure connector such that the computer system device is adapted to be coupled to the computer system backplane, the enclosure to isolate an EMI environment of the computer system device from EMI outside the enclosure.

2. The managed sub-environment module of claim 1 wherein the computer system device comprises high-frequency core integrated circuit chips of the computer system, including a CPU, memory, and memory control circuitry.

3. The managed sub-environment of claim 1 wherein the computer system device comprises a storage device.

4. The managed sub-environment of claim 1 wherein the computer system device comprises a storage device.

5. The managed sub-environment of claim 1 wherein the computer system device comprises an optional component of the computer system.

6. The managed sub-environment of claim 5 wherein the managed sub-environment further comprises a memory to store a driver software of the optional component of the computer system.

7. The managed sub-environment module of claim 1, further comprising an integral heat sink comprising a plurality of fins that are defined in at least one of said first and second half shells.

8. A computer system, comprising:

a backplane including a common bus including a power line;

a first modular managed sub-environment enclosure adapted to be coupled to the common bus, the first modular managed sub-environment enclosure containing core integrated circuitry of the computer system including a CPU and its associated relatively high frequency circuitry, including memory and memory control circuitry, the first modular managed sub-environment enclosure to control a thermal environment of the core integrated circuitry and to enclose an electromagnetic interference (EMs) environment of the core integrated circuitry, the first modular managed sub-environment having an air inlet disposed thereon and an air outlet disposed thereon and a blower adapted to circulate air from the air inlet to the air outlet;

a second modular managed sub-environment enclosure adapted to be coupled to the common bus in which relatively lower frequency circuitry including input/output bus controller circuitry is contained, said second managed sub-environment enclosure having an air inlet disposed thereon and an air inlet disposed thereon and an air outlet disposed thereon and a blower adapted to circulate air from the air inlet to the air outlet, and an outer enclosure to enclose the backplane and the first and second managed sub-environment enclosures, wherein the CPU comprises a microprocessor that is implemented using an architecture that distributes interface functionality amongst relatively high frequency North Bridge/Cluster circuitry and relatively low frequency South Bridge/Cluster circuitry, and wherein the first modular managed sub-environment enclosure includes circuitry associated with the North Bridge/Cluster and the second modular managed sub-environment enclosure includes circuitry associated with the South Bridge/Cluster such that EMI is substantially eliminated from coupling between the North Bridge/Cluster circuitry and the South Bridge/Cluster circuitry.

9. The computer system of claim 8 wherein the computer system further comprises a third modular managed sub-environment enclosure adapted to be coupled to the common bus, the third modular managed sub-environment enclosure to include a storage device, the third modular managed sub-environment enclosure to control a thermal environment of the storage device and to enclose an EMI environment of the storage device, the outer enclosure to enclose the third modular managed sub-environment enclosure.

10. The computer system of claim 8 wherein the computer system further comprises a fourth modular managed sub-environment enclosure adapted to be coupled to the common bus, the fourth modular managed sub-environment enclosure to include an optional component of the computer system and a memory to store a driver software for the optional component, the fourth modular managed sub-environment enclosure to control a thermal environment of the optional component and the memory and to enclose an EMI environment of the optional component and the memory, the outer enclosure to enclose the fourth modular managed sub-environment enclosure.

11. The computer system of claim 10 wherein the optional component comprises input/output controller circuitry.

12. The computer system of claim 10 wherein the optional component comprises modem circuitry.

13. The computer system of claim 10 wherein the optional component comprises network interface circuitry.

14. The computer system of claim 8 wherein the core integrated circuitry comprises a processor, the first modular managed sub-environment enclosure to control a thermal environment of the processor and to enclose an EMI environment of the processor.

15. The computer system of claim 8 wherein the core integrated circuitry comprises a processor chip set, the first modular managed sub-environment enclosure to control a thermal environment of the processor chip set and to enclose an EMI environment of the processor chip set.

16. The computer system of claim 8 wherein the core integrated circuitry comprises graphics circuitry, the first modular managed sub-environment enclosure to control a thermal environment of the graphics circuitry and to enclose an EMI environment of the graphics circuitry.

17. The computer system of claim 8 wherein the backplane comprises a plurality of backplane connectors coupled to the common bus, each one of the plurality of backplane connectors adapted to be engaged with an enclosure connector of one of a plurality of modular managed sub-environment enclosures.

18. The computer system of claim 8 wherein the first modular managed sub-environment enclosure includes a heat exchanger to control the thermal environment of the core integrated circuitry.

19. The computer system of claim 18 wherein the heat exchanger comprises the blower to pass air through the first modular managed sub-environment enclosure to control the thermal environment of the core integrated circuitry.

* * * * *